United States Patent
Perkins et al.

(10) Patent No.: US 8,655,169 B2
(45) Date of Patent: Feb. 18, 2014

(54) DEGRADATION ADAPTATION NETWORK

(75) Inventors: Drew D. Perkins, Saratoga, CA (US); David F. Welch, Atherton, CA (US)

(73) Assignee: Infinera Corporation, Sunnyvale, CA (US)

( * ) Notice: Subject to any disclaimer, the term of this patent is extended or adjusted under 35 U.S.C. 154(b) by 1105 days.

(21) Appl. No.: 12/239,896

(22) Filed: Sep. 29, 2008

(65) Prior Publication Data

US 2010/0080562 A1    Apr. 1, 2010

(51) Int. Cl.
*H04B 17/00*    (2006.01)

(52) U.S. Cl.
USPC ............. 398/26; 398/25; 398/27; 398/98; 398/99; 398/100; 714/776

(58) Field of Classification Search
USPC ............ 398/25, 26, 27, 98, 99, 100; 714/776
See application file for complete search history.

(56) References Cited

U.S. PATENT DOCUMENTS

| | | | |
|---|---|---|---|
| 6,598,188 B1 * | 7/2003 | Locke et al. | 714/704 |
| 6,870,874 B2 * | 3/2005 | Izumi | 375/132 |
| 2002/0010892 A1 * | 1/2002 | Lodge et al. | 714/777 |
| 2005/0138524 A1 * | 6/2005 | Cioffi | 714/758 |
| 2007/0049207 A1 * | 3/2007 | Haghighat et al. | 455/69 |
| 2010/0003032 A1 * | 1/2010 | Houle et al. | 398/79 |

\* cited by examiner

*Primary Examiner* — Jessica Stultz
*Assistant Examiner* — Joshua King
(74) *Attorney, Agent, or Firm* — David L. Soltz

(57) ABSTRACT

Consistent with the present disclosure, based on system requirements or in response to an increase in optical signal-to-noise level of an optical channel, such as a WDM channel, additional FEC bits are inserted into and replace selected data payload bits in each frame carried by the channel. The replaced data payload bits may then be transmitted in subsequent frames on the same channel. As a result, the transmitted frames have a reduced data payload rate, but a higher coding gain. Alternatively, the replaced data payload bits may be included in frames transmitted on another optical channel. In that case, the frames carried by the two channels typically have the same bit length or number of bits and may thus be compliant with the frame length requirements of G.709, for example. Preferably, the number of coding bits may be changed dynamically to obtain different coding gains.

17 Claims, 8 Drawing Sheets

DEGRADATION ADAPTATION NETWORK

FIELD OF THE DISCLOSURE

The present disclosure is directed toward an communication system and related method, and more particularly a communication system that can improve signal quality.

BACKGROUND OF THE INVENTION

The ITU-T G.709 recommendation entitled, "Interface for the optical transport network (OTN)" (hereinafter "G.709") is an international standard for optical networks and is intended to converge existing packet services, such as ATM, IP Ethernet, and TDM broadband services as well as SONET and SDH. A network terminal compliant with G.709 transports data frames or Optical Transport Units (OTUs) at a fixed frame length and with a fixed rate of, for example, of 10.7 Gigabits/second ("Gbit/s"). Since each frame includes forward error correction (FEC) bits and overhead bits, the effective payload data rate of a 10.7 Gbit/s G.709 OTU2 payload is approximately 10 Gbit/s.

Wavelength division multiplexed (WDM) systems compliant with G.709 are known. In such systems, a plurality of optical channels, each at a different wavelength, carry the data frames. WDM systems or spans typically include a transmit terminal, where the optical channels are combined onto an optical communication path, and a receive terminal, where the optical channels are demultiplexed and supplied to corresponding receivers. Typically, one or more optical amplifier components may be provided between transmit and receive terminals in order to offset losses associated with the optical communication path. Various components within a WDM system may degrade over time. As a result, over the life of a WDM system, performance may degrade such that the system does not communicate error free or may not communicate at all.

SUMMARY

Consistent with the present disclosure, a communication method is provided which includes transmitting a first frame at a baud rate on an optical channel. The first frame has a bit length and a first payload having first data payload bits. The first frame further includes first forward error correction bits such that the first frame has an associated first coding gain and first payload data rate. The method also includes transmitting a second frame at the baud rate on the optical channel. The second frame has the same bit length as the first and includes a second payload having second data payload bits. The second frame further includes second forward error correction bits. A number of the first data payload bits being more than a number of the second data payload bits, and a number of the first forward error correction bits being less than a number of the second forward error correction bits, such that the second frame has a higher overhead ratio than the first frame. In addition, the second frame has an associated second coding gain that is greater than the first coding gain and a second payload data rate less than the first payload data rate.

Consistent with a further aspect of the present disclosure, a communication terminal is provided which includes a control circuit configured to output a first control signal when a noise level, e.g., an optical signal-to-noise (OSNR) associated with an optical communication path coupled to the communication terminal has a first a first value, and output a second control signal when the OSNR associated with the optical communication path has a second value. The communication terminal also includes a transmitter configured to output, in response to the first control signal, a first frame having a baud rate and an associated first payload data rate, as well as a bit length. The transmitter also being configured to supply an optical channel that carries the first frame to the optical communication path. The first frame including first forward error correction bits, such that the first frame has an associated first coding gain and a first payload having first data payload bits. The transmitter is further configured, such that, in response to the second control signal, it outputs a second frame on the optical channel. The second frame has the same baud rate as the first frame and an associated second payload data rate less than the first payload data rate. The second frame has the same bit length as the first frame and includes second forward error correction bits such that the second frame has a higher overhead ratio than the first frame. In addition, the second frame has an associated second coding gain greater than the first coding gain. It is to be understood that both the foregoing general description and the following detailed description are exemplary and explanatory only and are not restrictive of the invention, as claimed.

The accompanying drawings, which are incorporated in and constitute a part of this specification, illustrate embodiments of the present disclosure.

DESCRIPTION OF THE EMBODIMENTS

Reference will now be made in detail to exemplary embodiments of the present disclosure, examples of which are illustrated in the accompanying drawings. Wherever possible, the same reference numbers will be used throughout the drawings to refer to the same or like parts.

Consistent with the present disclosure, based on system requirements or in response to a decrease in optical signal-to-noise ratio (OSNR) for example, additional FEC bits are inserted into and replace selected data payload bits in each frame output by a transmitter on a channel in a WDM system. The replaced data payload bits may then be transmitted in subsequent frames on the same channel. As a result, the transmitted frames have a reduced data payload rate, but a higher coding gain. Alternatively, the replaced data payload bits may be included in frames transmitted on another optical channel. In that case, the frames carried by the two channels may have the same or different bit lengths (number of bits) and may be compliant with the frame length requirements of G.709, for example. Preferably, the number of coding bits may be changed dynamically to obtain different coding gains.

Figure 1:
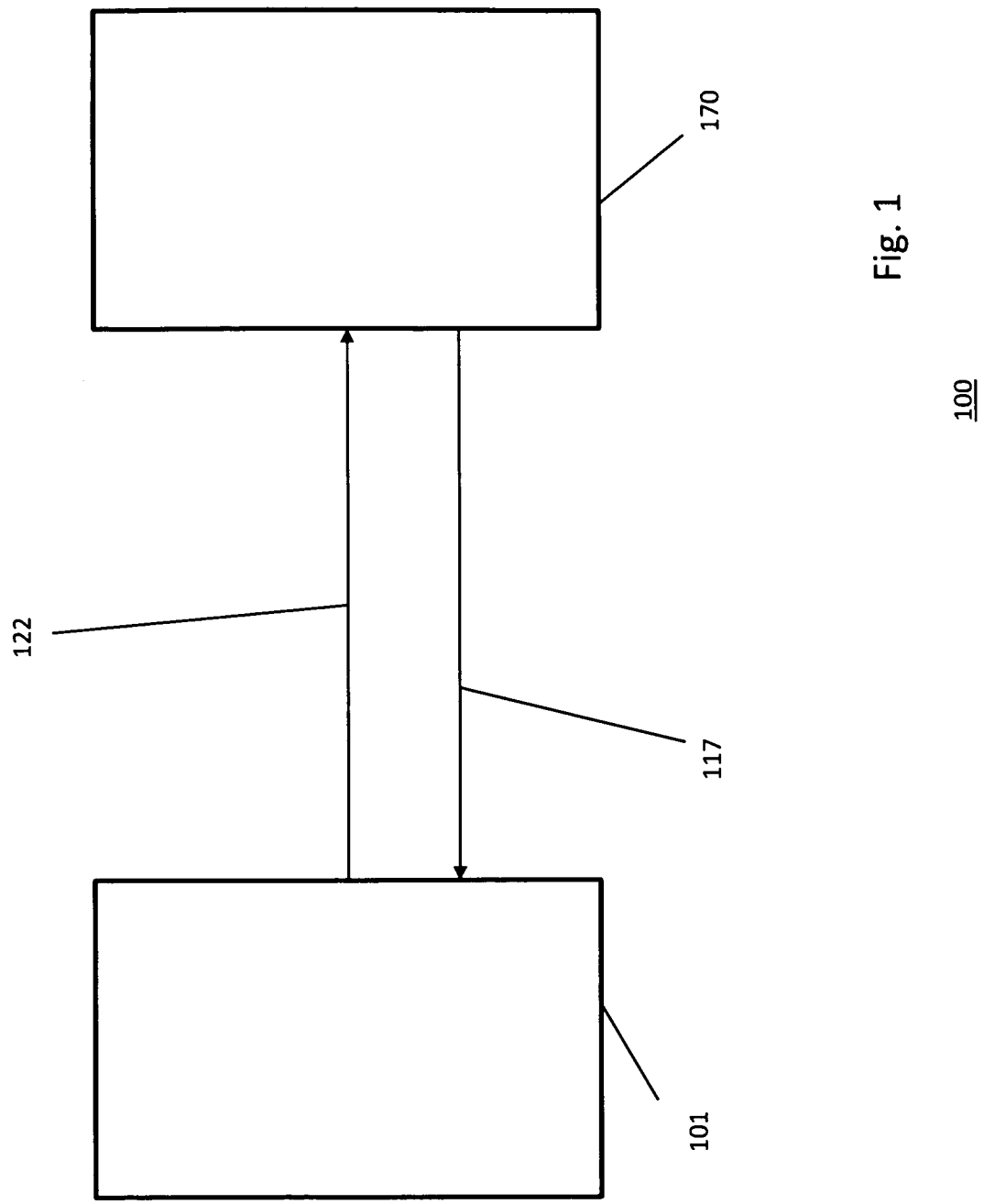
FIG. 1 illustrates a block diagram of a communication system consistent with an aspect of the present disclosure.

FIG. 1 illustrates a communication system 100 consistent with the present disclosure. Communication system 100 includes a first terminal 101 which communicates in a first direction with a second terminal 170 via a communication path 122, which may include, for example, an optical fiber. Second terminal 170 may also communicate with first terminal 101 in a second direction via optical communication 117.

Figure 2:
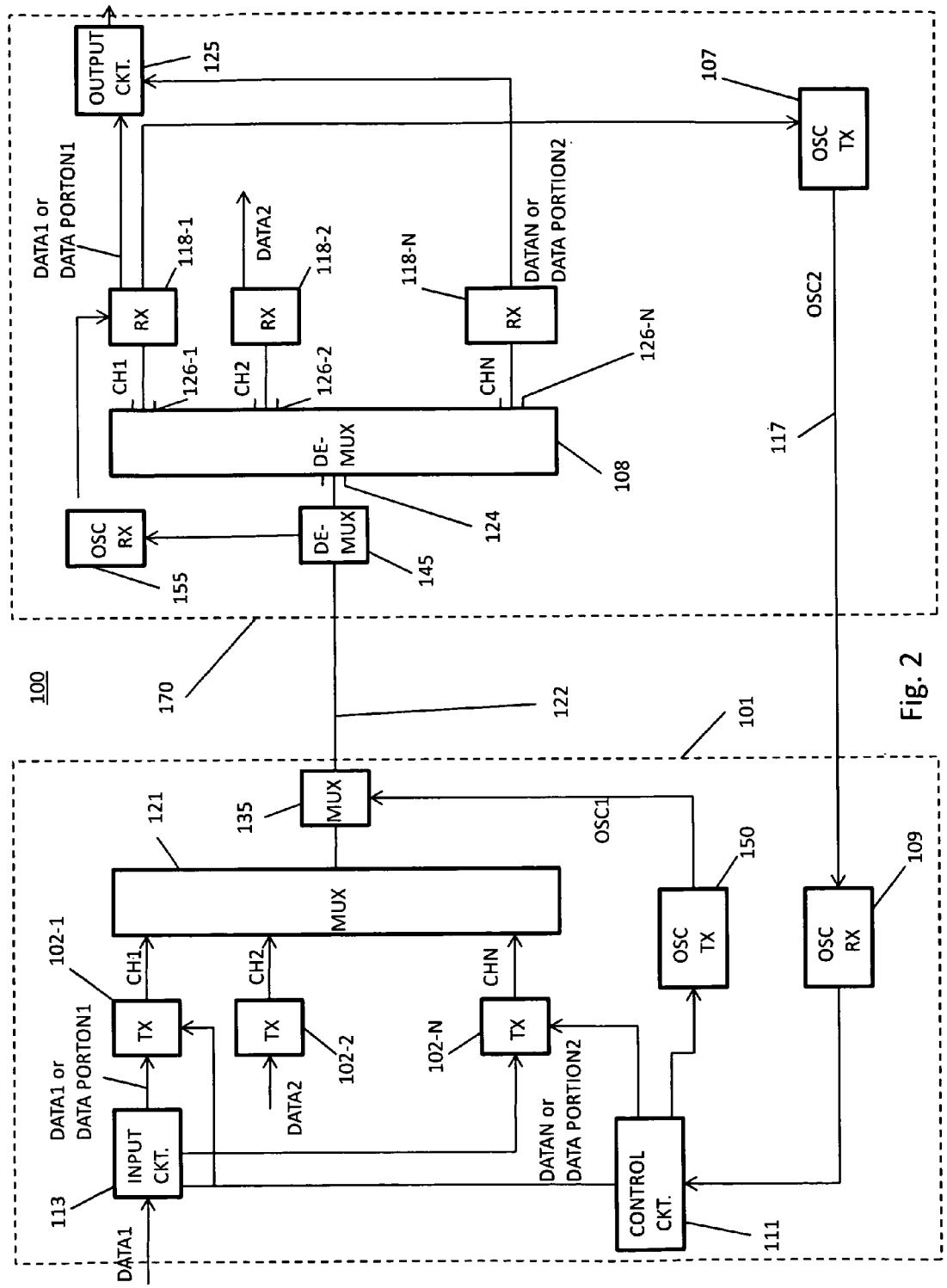
FIG. 2 illustrates a detailed block diagram of the communication system shown in FIG. 1.

FIG. 2 illustrates a communication system 100 in greater detail. First terminal 101 has a plurality of transmitter circuits 102-1 to 102-N. Transmitter circuits 102-1 and 102-n supply data modulated optical channels or optical signals CH1 to CHN, respectively, in response to corresponding data signals DATA1 and DATAN. Data modulated optical channels CH1 and CHN are transmitted at corresponding ones of wavelengths $\lambda 1$ to $\lambda N$.

As further shown in FIG. 2, each of optical channels CH1 to CHN are combined onto optical communication path 122 by optical multiplexer or combiner 121. Optical communication path 122 typically includes one or more segments of optical fiber and supplies optical channels CH1 to CHN to second terminal 170. Collectively, optical channels CH1 to CHN may constitute a wavelength division multiplexed signal.

First terminal 101 also includes a control circuit 111 coupled to input circuit 113, which may either pass data signal DATA1 in its entirety or supply a portions of DATA1 as DATA PORTION1 and DATA PORTION2 to transmitter circuits 102-1 and 102-N, respectively. In that case, transmitter circuit 102-N may not receive data signal DATAN, but, as noted above, receives the second portion of data signal DATA1, i.e., DATA PORTION2, instead. Control circuit 111 is also coupled to optical service channel (OSC) transmitter circuit 150, which supplies an optical service channel (OSC1) at a wavelength different than that of optical channels CH1 and CH2 to multiplexer 135. Multiplexer 135 is coupled to optical communication path 122 and forwards OSC1 along with optical channels CH1 and CH2 toward demultiplexers 145 and 108 in second terminal 170. At demultiplexer 145, OSC1 is output toward OSC receiver circuit 155, while channels CH1 to CHN are passed to input port 124 of demultiplexer 108, which typically includes one or more optical demultiplexing components, such as an arrayed waveguide grating and/or filters.

Optical demultiplexer 108 outputs a corresponding one of optical channels CH1 and CHN at a respective one of output ports 126-1 to 126-N. Each of receiver circuits 118-1 to 118-N are coupled to a corresponding one of output ports 126-1 to 126-N, and are configured to receive a respective one of optical channels CH1 and CHN. In response to the received channels, receiver circuits 118-1 to 118-N output data signals DATA1 to DATAN, respectively, to output circuit 125. Alternatively, DATA PORTION1 and DATA PORTION2 may be output from receiver circuits 118-1 and 118-N, respectively, to output circuit 125 (see below). In addition, OSC receiver circuit 155 may supply a control signal to receiver circuit 118-1, as discussed in greater detail below.

When DATA PORTION1 is transmitted on optical channel CH1, DATA PORTION2 is supplied to transmitter circuit 102-N and transmitted on optical channel CHN. At demultiplexer 108, optical channel CHN is received through port 124 and output through port 126-N to receiver circuit 118-N. DATA PORTION2 is then output from receiver circuit 118-N to output circuit 125, where it is combined with DATA PORTION 1.

Receiver circuit 118-1 also outputs signals to optical service channel (OSC) transmitter circuit 107, which, in turn, outputs optical service channel (OSC2) to OSC receiver circuit 109 onto optical communication path 117 (which may also carry other optical channels that are not shown). OSC receiver circuit 109, in turn, outputs a signal to control circuit 111, which, in turn, may output the control signal to input circuit 113. The operation of circuits 118-N, 107, 109, 111, 113, 125, 150, and 155 will be discussed in greater detail below.

Figure 3:
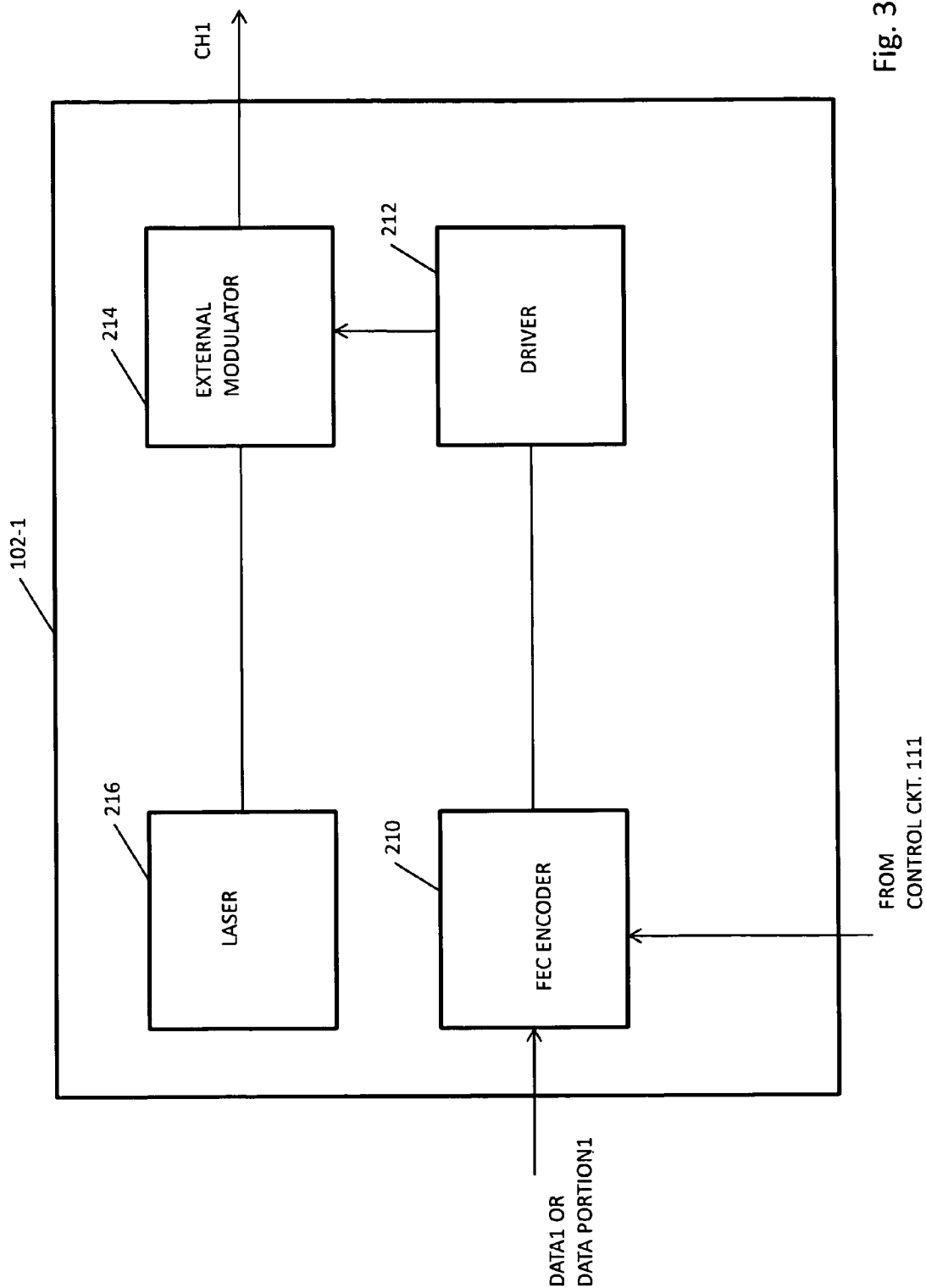
FIG. 3 illustrates a block diagram of a transmitter circuit consistent with an aspect of the present disclosure.

FIG. 3 shows transmitter circuit 102-1 in greater detail. It is understood that transmitter circuits 102-2 to 102-N may have the same or similar structure as transmitter circuit 102-1. As shown in FIG. 2, data signal DATA1 (or DATA PORTION1), in electrical form, is supplied to transmitter circuit 102-1 and fed to forward error correction (FEC) encoder 210, which encodes the data signal in accordance with a known code, such as a Reed-Solomon code. FEC encoder 210 outputs the encoded data as a series of frames, each of which including a header or overhead, payload, and FEC bits (to be discussed in greater detail below). The encoded data is supplied to a known driver circuit 212, which supplies appropriate drive signals to an external modulator 214. External modulator 214, which may include a Mach-Zehnder interferometer, modulates the output of laser 216 in accordance with the drive signal to generate modulated optical channel CH1, which carries the frames of FEC encoded data. Alternatively, external modulator 214 may include an electro-absorption modulator or another known external modulator. Moreover, laser 216 may be directly modulated with an appropriate drive signal, and, in that case, external modulator 214 may be omitted. Optical channel CH1 may be modulated in accordance with a variety of modulation formats, such as OOK, QAM, QPSK, DPSK, DQPSK, or duobinary.

As further shown in FIG. 3, FEC encoder circuit 210 receives an output from control circuit 111, which, as discussed in greater detail below, is used to control the number of FEC bits in each frame output from FEC encoder circuit 210.

Figure 4:
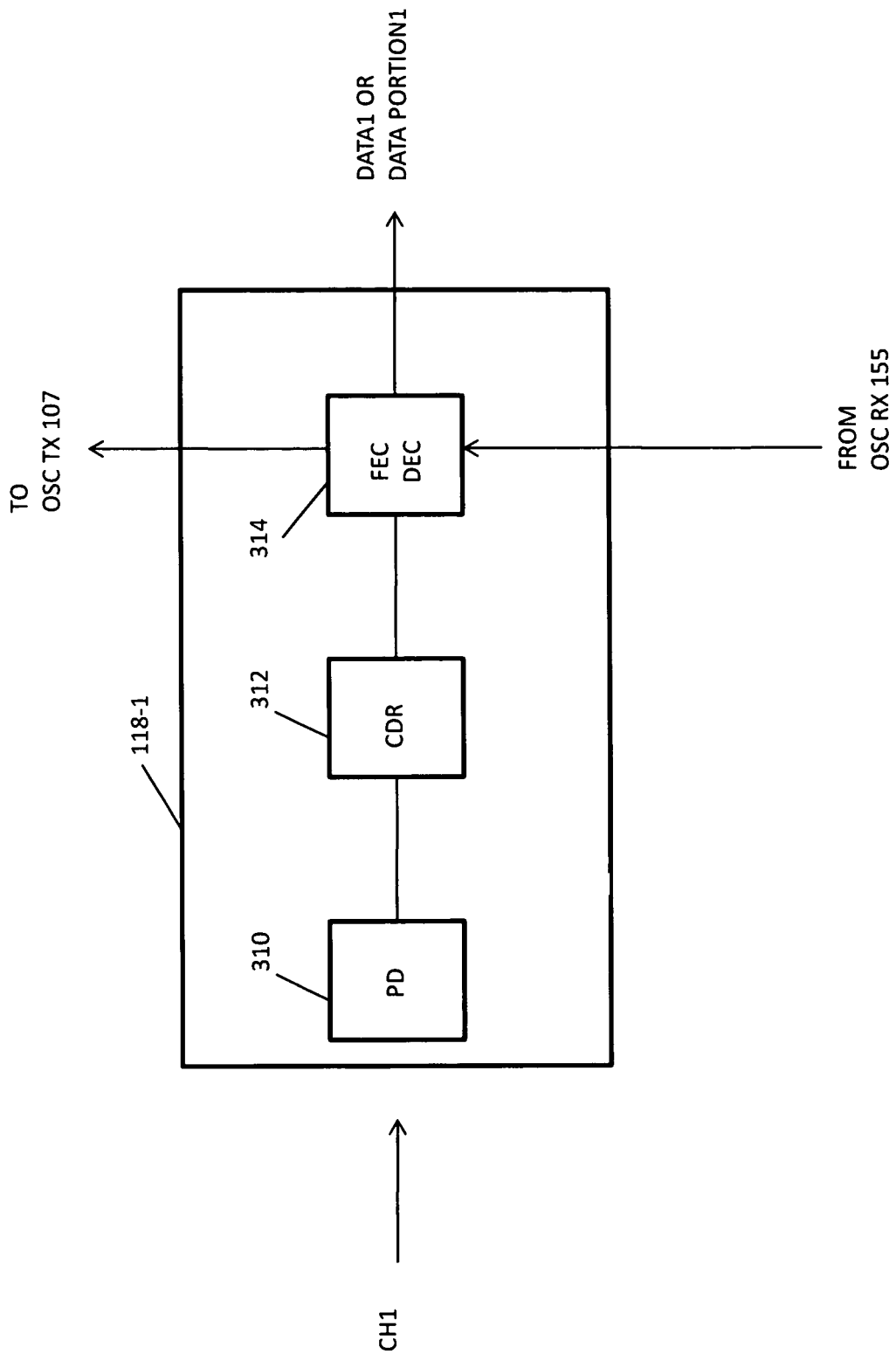
FIG. 4 shows a block diagram of a receiver circuit consistent with the present disclosure.

An exemplary receiver circuit 118-1 is shown in FIG. 4. Receiver circuits 118-2 and 118-N may have the same or similar structure as receiver circuit 118-1.

As shown in FIG. 4, receiver circuit 118-1 includes a photodetector, which receives a corresponding one of optical channels CH1, CH2, and CHN, namely optical channel CH1. Photodetector 310 converts optical channel CH1 to a corresponding electrical signal, which is supplied to a known clock and data recovery circuit (CDR) 312, which, in turn, supplies frames, to FEC decoder circuit 314. Decoder circuit 314 receives information from OSC receiver circuit 155 indicative of the number of FEC bits in each frame so that decoder circuit 314 can appropriately decodes the received frames in a known manner. Accordingly, DATA1 (or DATA PORTION1) is output to output circuit 125. When DATA PORTION1 and DATA PORTION2 are transmitted on channels CH1 and CHN, respectively, output circuit 125 combines these data portions to supply DATA1. FEC decoder circuit 314 may also provide an output to optical service channel (OSC) transmitter 107, as discussed in greater detail below.

Figure 5:
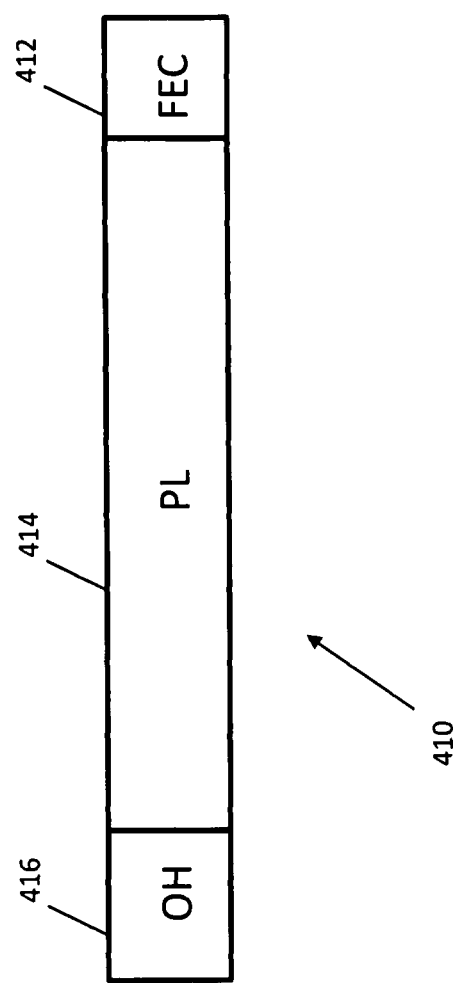
FIG. 5 illustrates a frame.
Figure 6:
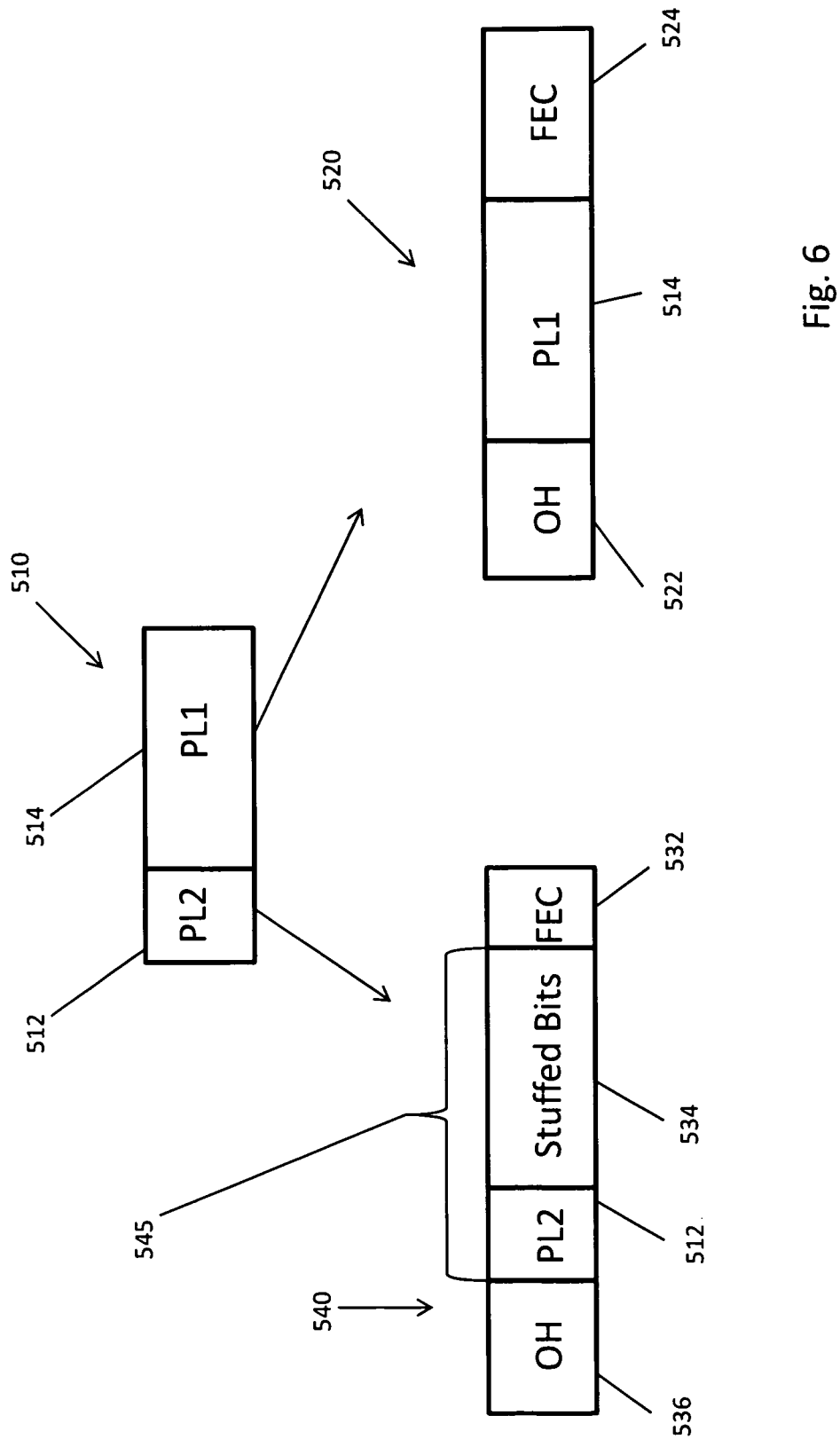
FIG. 6 illustrates additional frames consistent with an aspect of the present disclosure.
Figure 7:
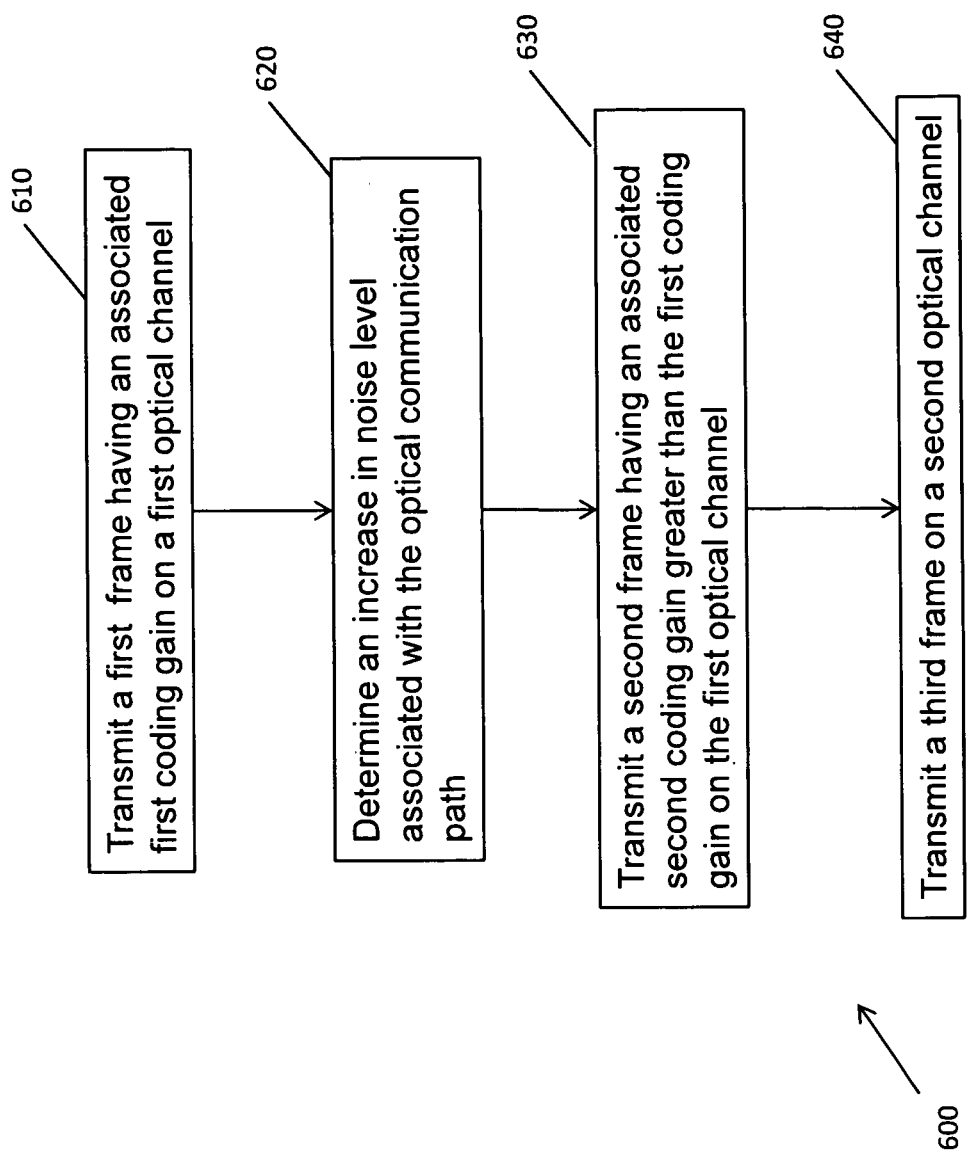
FIG. 7 illustrates a flowchart of a method consistent with a further aspect of the present disclosure.

The operation of system 100 will next be described with reference to FIGS. 5-7, and with further reference to FIGS. 1-4. FIG. 5 illustrates an exemplary frame consistent with the present disclosure; FIG. 6 illustrates additional exemplary frames consistent with an additional aspect of the present disclosure; and FIG. 7 shows a flow chart 600 of a method consistent with a further aspect of the present disclosure.

FIG. 5 illustrates an exemplary frame 410 consistent with an aspect of the present disclosure. Frame 410 may be output by FEC encoder circuit 210, for example, and may include overhead bits 416, a payload 414 including data payload bits, and FEC bits 412. If the noise level associated with optical communication path 122 is relatively low (high OSNR), for example, control circuit 111 outputs a control signal to transmitter 102-1 so that FEC encoder circuit 210 generates fewer FEC bits and the entire payload (e.g., payload 414) is included in the transmitted frame. Frame 410, therefore, has a relatively low overhead ratio.

Payload 414 may include information bits of data signal DATA1, which is supplied to transmitter circuit 102-1 via input circuit 113. A number of such information bits is typically equal to a number of the bits in payload 414. Frame 410 (a "first frame") may be transmitted on optical channel CH1 (step 610 of FIG. 7), which is supplied to input port 124 of demultiplexer 108 and fed to receiver circuit 118-1 via output port 126-1. Phodetector 310 converts optical channel CH1 into a corresponding electrical signal, which is supplied to clock and data recovery (CDR) circuit 312, which, in turn, reconstructs the frames carried by optical channel CH1. These frames are then supplied to FEC decoder circuit 314.

FEC decoder circuit 314 may include known circuitry for monitoring the optical signal-to-noise ratio (OSNR) and/or the bit error rate (BER) associated with the frames output from CDR 312. FEC decoder circuit 314 may also output information associated with these parameters to optical service channel (OSC) transmitter 107. OSC transmitter 107 may include circuitry configured to determine changes in a parameter indicative of the noise level of optical communication path 122 has increased from a first value to a second value (step 620) (OSNR has decreased). The parameter may be BER, SNR or other information associated with the quality of optical channel CH1. If the noise level has increased sufficiently, OSC transmitter 107 may transmit via optical service channel OSC2 an indication that the noise level associated with optical communication path 122 has increased beyond a predetermined threshold. OSC2 is transmitted on optical communication path 117 and is input to OSC receiver circuit 109 at transmitter terminal 101.

In response to OSC2, OSC receiver circuit 109 outputs an electrical signal carrying the noise level indicator to control circuit 111, which, in turn, outputs a control signals to input circuit 113, transmitter circuit 102-1, and transmitter circuit 102-N. In response to a first control signal, input circuit 113 divides information bits 510 (see FIG. 6) of data signal DATA1 into a group of first bits 514 (PL1), which is supplied to transmitter circuit 102-1, and a group of second bits or data payload bits 512 (PL2), which is supplied to transmitter circuit 102-N. A sum of bits 512 and 514 is equal to the number of data payload bits of payload 414.

In response to a control signal supplied from control circuit 111, FEC encoder circuit 210 determines a number of FEC bits 524, and appends these bits, as well as overhead or header bits 522, to data payload bits 514 to form frame 520. Electrical signals associated with frame 520 are supplied to driver circuit 212, for modulating the output of laser 216 to generate optical channel CH1 carrying frame 520. Frame 520 is thus transmitted on optical channel CH1 to demultiplexer 108 (step 630).

It is noted that in the example described above, frame 520 has more FEC bits (and fewer data payload bits) than frame 410, and the number of additional FEC bits in frame 520 is typically equal to the number of information bits 512 supplied to transmitter circuit 102-N. Thus, although both frames 410 and 520 have the same bit length and baud rate (i.e., bits (including header, FEC and payload) per second), the coding gain and overhead ratio (a "second coding gain") associated with frame 520 is greater than the coding gain and overhead ratio associated with frame 410. Also, since frame 520 has fewer payload bits than frame 410, the data payload rate (i.e., the number of payload bits per second) is less for frame 520 than it is for frame 410. Preferably, the amount of coding gain, as dictated by the control signal, and ultimately based on the parameters (e.g., OSNR and BER) measured in receiver circuit 118-1, is varied in accordance with the noise level or OSNR associated with optical communication path 122.

Transmitter circuit 102-N receives a further control signal from circuit 111, and, in response to this signal, outputs frame 540 (a "third frame") including second information bits 512 (PL2) as data bits in payload 545, FEC bits 532 and overhead bits 536. In addition, stuffed bits 534 may also be included in payload 545 so that frame 540 has the same bit length as frames 410 and 520. Alternatively, payload bits from other channels, such as optical channels CH2, CH3, etc. may be included payload 545 (see below). If necessary, the number of FEC bits 532 in frame 540 may be the same as that of FEC bits 524 in frame 520. Frame 540 may then be transmitted by transmitter circuit 102-N on optical channel CHN to demultiplexer 108 (step 640). In one example, the length and rate (10.709 Gbit/s) associated with each of frames 410, 520, and 540 is G.709 compliant.

Control circuit 111 may also supply an additional control signal to OSC transmitter circuit 150, such that OSC transmitter circuit 150 outputs optical service channel OSC1, which carries an indication of the number of FEC bits in frame 520. OSC1 is supplied to optical communication path 122 by combiner or multiplexer 135; is transmitted to demultiplexer 145; and output to OSC receiver circuit 155. The FEC bit indicator is then fed to FEC decoder circuit 314 and may also be supplied to receiver circuit 118-N.

Optical channels CH1 and CHN, carrying frames 520 and 540, respectively, are output from ports 126-1 and 126-N, respectively, to receiver circuits 118-1 and 118-N. FEC decoder circuits in receiver circuits (e.g., FEC decoder circuit 314) appropriately decode frames 520 and 540 based on the FEC bit indicator received by OSC receiver circuit 155. The first group of information bits 514 (PL1 also DATA PORTION1) and the second group of information bits 512 (PL2 also DATA PORTION2) included in frames 520 and 540, respectively, are output from receiver circuits 118-1 and 118-N to output circuit 125. Under the control of OSC receiver circuit 155, information bits groups 512 and 514 are combined to reconstruct information bit grouping 510 of data signal DATA1, which was initially received by input circuit 113. Alternatively, when the signal quality associated with optical channel CH1 is not substantially degraded, it is not necessary to divide the data signal into portions which are transmitted on separate optical channels in system 100. In that case, data signal DATA1 is kept intact and is passed through output circuit 125.

In the above examples, only the information bits associated with DATA1 are parsed into groups for transmission on separate optical channels and that the signal quality of only one channel in system 100 is monitored. It is contemplated, however, that other data streams, e.g., DATA2, may be monitored and the information bits associated with these streams may also be carried by optical channel CHN. In addition, the number of FEC bits transmitted on other channels in system 100 may be increased so that the coding gains associated with these channels may also be increased.

By way of example, by reducing the number of data payload bits of a G.709 frame so that the effective data transmission rate drops from 10 Gbit/s to 7.5 Gbit/s, and replacing those data payload bits with additional FEC bits, the coding gain can be increased from 9 dB to 12 dB.

Consistent with a further aspect of the present disclosure, instead of transmitting payload bits over channels CH1 and CHN, the payload bits may be transmitted over multiple frames output by transmitter 102-1 and carried by the same channel, e.g., channel CH1. As such, each frame transmitted on channel CH1 would have a similar structure as frame 520 discussed above. That is, each would typically have the same bit length and fixed baud rate, e.g., 10.709 Gbits/s, but an increased coding gain relative to frame 410. In addition, each frame would have fewer payload bits and, therefore, a lower data payload rate than that of frame 410. As further noted above, the number of FEC bits in each frame and, thus, the coding gain, is preferably variable depending upon, for example, the noise level associated with optical communication path 122. Table 1 below lists examples of payload data rates (D) for frames transmitted (e.g., frame 520) by transmitter 102-1 and percentages of FEC bits in each frame (FEC %) as the signal-to-noise (SNR) decreases from a value of SNR1 to SNR4, where SNR1>SNR2>SNR3>SNR4. These progressively lower SNR values may be attributable to an increased noise level of optical communication path 122 and the different D and FEC % values are generated in response to these different noise levels.

TABLE 1

| SNR | Baud Rate (Gbit/s) | D (Gbit/s) | FEC % |
|-----|--------------------|------------|-------|
| S1  | 10.7               | 10.7       | 0     |
| S2  | 10.7               | 10         | 7     |
| S3  | 10.7               | 9.3        | 14    |
| S4  | 5.35               | 5          | 7     |

As shown in Table 1, at relatively low SNR values (e.g., S1), no FEC bits may be necessary, and the data payload rate may equal the baud rate for frames output by transmitter 102-1. As the SNR increases to higher values, e.g., S2 and S3, the number of FEC bits increases such that the percentage of FEC bits in each frame, FEC %, also increases, while the data payload rate decreases. In the example shown in Table 1, for an SNR of S2, 7% of the frame bits are FEC bits and the data payload rate is 10 Gbit/s. At a higher SNR of S3, the percentage of FEC bits increases to 14 and the data payload rate decreases to 9.3 Gbit/s. Lastly, if the SNR increases further to a value of S4, the baud rate of the frames may be decreased, e.g., to 5.35 Gbit/s which would further decrease the number of data payload bits, e.g., to 5 Gbit/s, while the percentage of FEC bits may be 7% of the bits in such lower rate frames. Since the baud rate is decreased when the SNR is increased to S4, the number of bits in the frames transmitted at the lower baud rate is also decreased relative to the bit lengths associated with SNR values of S1 to S3, which are preferably same.

In the above example, the noise level information is transmitted out-of-band via optical service channels OSC1 and OSC2. It is understood, however, that the noise level information may be transmitted in-band and may be included, for example, in the overhead (OH) portions of the transmitted frames.

Figure 8:
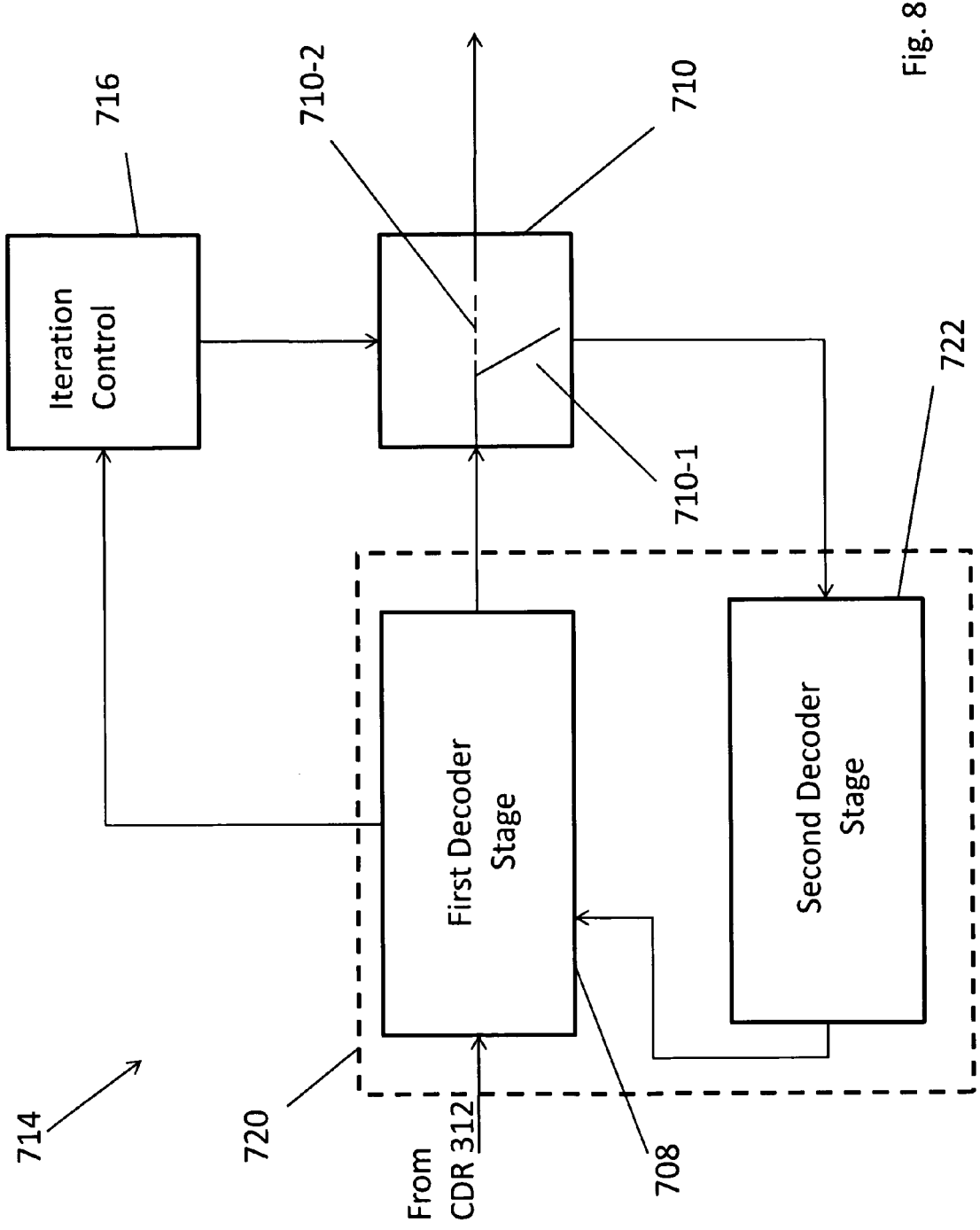
FIG. 8 illustrates a block diagram of a receiver circuit consistent with an additional aspect of the present disclosure.

Consistent with an additional aspect of the present disclosure, FEC decoder 314 (see FIG. 3) in receiver circuit 118-1, for example, may be replaced with circuitry 714 shown in FIG. 8. Circuitry 714 includes an iterative decoder circuit 720 having a first decoder stage 708 and a second decoder stage 722. The first decoder stage 708 may decode a first frame received from clock and data recovery circuit 312 in accordance with a first forward error correction algorithm and supply a decoded output to switch 710. First decoder stage 708 may also supply a signal-to-noise (SNR) value (a first SNR value) associated with optical channel CH1 carrying the first frame to iteration control circuit 716. Iteration control circuit 716, in turn, may determine, based on the first SNR value, a number of iterations through which iterative decoder 720 decodes the first frame. In particular, during iterative decoding, iteration control circuit 716 may supply an appropriate control signal so that switch 710 is configured in position 710-1. In this position, iterative processing is facilitated by feeding back the output of first decoder stage 708 to second decoder stage 722, which, in turn, provides further error correction of the decoded frame in accordance with a second forward error correction algorithm. Second decoder stage 722 then feeds its output to first decoder 708 so that additional error correction can take place, thus completing one iteration.

In second and subsequent iterations, the above process is repeated whereby the output of first decoder stage 708 is fed back to second decoder stage 722, and the output of second decoder stage 722 is supplied to first decoder stage 708. As noted above, iteration control circuit 716 determines the number of such iterations based on the SNR value associated with optical channel CH1. After these iterations are completed, switch 710 changes to position 710-2 and the first frame is output with a desired bit error rate.

If the signal-to-noise ratio of optical channel CH1 decreases, first decoder stage 722 may supply an appropriate SNR value (a second value) to iteration control circuit 716 to increase the number of iterations for decoding a second frame supplied to iterative decoder 720, while such lower SNR is present on CH1. As a result, increased error correction can be provided to offset the higher number of transmission errors expected when CH1 has a lower SNR.

Although calculation of SNR values has been described above as taking place in first decoder stage 708, such functionality may be provided in iteration control circuit 716. In addition, although circuitry 714 has been described in connection with a single receiver circuit, 118-1, it is understood that similar decoding circuitry may be provided in the remaining receiver circuits shown in FIG. 2. Moreover, the iteration number calculated by iteration control circuit 716 may be any appropriate number to achieve a desired level of error correction. In addition, since the embodiment shown in FIG. 8 does not require changes in the number of FEC bits and overhead ratio, control circuit 111, which varies the number of FEC bits in each frame, may be omitted.

Other embodiments of the invention will be apparent to those skilled in the art from consideration of the specification and practice of the invention disclosed herein. For example, the number of FEC bits in each frame may be preset by each transmitter prior to installation so that the same transmitter circuitry and same amplifiers may be used in WDM systems having different span noise levels. In addition, other parameters besides BER and SNR may be monitored to determine the appropriate number of FEC bits to be inserted into each frame. It is intended that the specification and examples be considered as exemplary only, with a true scope and spirit of the invention being indicated by the following claims.

What is claimed is:

1. A communication method, comprising:
    transmitting a first frame at a baud rate on a first optical channel having a first wavelength, the first frame having a bit length, the first frame including a first payload having first data payload bits, the first frame further including first forward error correction bits such that the first frame has an associated first coding gain and first payload data rate;
    transmitting a second frame at the baud rate on the first optical channel, the second frame having the same bit length as the first frame and including a second payload having second data payload bits, the second frame further including second forward error correction bits, a number of the first data payload bits being more than a number of the second data payload bits, and a number of the first forward error correction bits being less than a number of the second forward error correction bits, such that the second frame has an associated second coding gain greater than the first coding gain and a second payload data rate less than the first payload data rate;

receiving a plurality of information bits, a number of the plurality of information bits being equal to the number of said first data payload bits, first ones of the plurality of information bits being included in the second frame as said second data payload bits;

generating a third frame including a third payload having third payload bits, second ones of the plurality of information bits, other than the first ones of the plurality of information bits, being included in the third frame as said third data payload bits; and transmitting the third frame on a second optical channel having a second wavelength different than the first wavelength.

2. A communication method in accordance with claim 1, wherein the optical channel is transmitted on an optical fiber, the communication method further comprising:

determining that a noise level of associated with the optical fiber has increased from a first value to a second value, such that a number of the second forward error correction bits is in accordance with the determined noise level.

3. A communication method in accordance with claim 1, further including:

stuffing fourth payload bits into the third payload of the third frame.

4. A communication method in accordance with claim 1, wherein a sum of the first and second ones of the plurality of information bits is equal to the number of first data payload bits.

5. A communication method in accordance with claim 1, wherein said baud rate complies with a G.709 standard.

6. A communication method in accordance with claim 1, wherein the baud rate is substantially equal to 10.709 Gigabits/second.

7. A communication terminal, comprising:

a control circuit configured to output a first control signal when a noise level associated with an optical fiber coupled to the communication terminal has a first a first value, and the control circuit is configured to output a second control signal when the noise level associated with the optical fiber has a second value;

a first transmitter configured to output, in response to the first control signal, a first frame having a baud rate and an associated first payload data rate, the first frame having a bit length, the transmitter being configured to supply a first optical channel carrying the first frame to the optical fiber, the first frame including first forward error correction bits such that the first frame has an associated first coding gain and a first payload having first data payload bits, wherein, in response to the second control signal, the transmitter is configured to output a second frame on the first optical channel, the second frame having the baud rate and an associated second payload data rate less than the first payload data rate, the second frame having the same bit length as the first frame, the second frame including second forward error correction bits such that the second frame has an associated second coding gain greater than the first coding gain and second data payload bits, such that a number of the second data payload bits is less than a number of the first data payload bits, an input circuit configured to receive a plurality of information bits, a number of the plurality of information bits being equal to a number of said first data payload bits;

a second transmitter configured to supply a second channel having a second wavelength to the optical fiber, the first wavelength being different than the second wavelength; and an optical combiner coupled to the first and second transmitters and configured to direct the first and second channels to the optical fiber, wherein, first ones of the plurality of information bits are included in the second frame as said second data payload bits, and the second transmitter generates a third frame at the baud rate such that the third frame is carried by the second optical channel, the third frame including a third payload having third payload bits, second ones of the plurality of information bits, other than the first ones of the plurality of bits, being included in the third frame as said third data payload bits.

8. A communication terminal in accordance with claim 7, wherein a sum of the first and second ones of the plurality of information bits is equal to the number of first data payload bits.

9. A communication terminal in accordance with claim 7, wherein said bit rate complies with a G.709 standard.

10. A communication terminal in accordance with claim 7, wherein the bit rate is substantially equal to 10.709 Gigabits/second.

11. A communication terminal in accordance with claim 7, wherein the second transmitter is configured to stuff fourth data payload bits into the third payload.

12. A communication terminal, comprising:

a first transmitter configured to transmit a first frame at a bit rate on a first optical channel, the first frame having a bit length and including a first payload having first data payload bits, the first frame further including first forward error correction bits, the first transmitter also being configured to transmit a second frame at the bit rate on the optical channel, the second frame having the same bit length as the first frame and including a second payload having second data payload bits, the second frame further including second forward error correction bits, a number of the first data payload bits being greater than a number of the second data payload bits, and a number of the first forward error correction bits being less than a number of the second forward error correction bits;

a second transmitter configured to transmit a second optical channel, the first and second optical channels having first and second wavelengths, respectively, the first and second wavelengths being different from one another;

an optical combiner configured to receive the first and second optical channels having the first and second wavelengths, respectively, and supply the first and second optical channels to an optical fiber;

an input circuit coupled to the first and second transmitters, the circuitry being configured to receive a plurality of information bits, a number of the plurality of information bits being equal to a number of said first data payload bits, first ones of the plurality of information bits being included in the second frame as said second data payload bits, wherein the second optical channel carries a third frame at the bit rate, the third frame having a third payload including third data payload bits, second ones of the plurality of information bits, other than the first ones of the plurality of data bits, being included in the third frame as said third data payload bits.

13. A communication terminal in accordance with claim 12, wherein a sum of the first and second ones of the plurality of information bits is equal to the number of first data payload bits.

14. A communication terminal in accordance with claim 12, wherein said bit rate complies with a G.709 standard.

15. A communication terminal in accordance with claim 12, wherein the bit rate is substantially equal to 10.709 Gigabits/second.

16. A communication terminal in accordance with claim 12, wherein the second transmitter is configured to stuff fourth data payload bits into the third frame.

17. A communication terminal in accordance with claim 12, wherein the first frame has an associated first coding gain and the second frame has an associated second coding gain less than the first coding gain.

* * * * *